United States Patent [19]
Jha et al.

[11] Patent Number: 5,553,770
[45] Date of Patent: Sep. 10, 1996

[54] HEAT EXCHANGER ASSEMBLIES-MATERIAL FOR USE THERIN, AND A METHOD OF MAKING THE MATERIAL

[75] Inventors: Sunil C. Jha, North Attleboro, Mass.; James A. Forster, Barrington, R.I.

[73] Assignee: Texas Instruments Incorporated, Dallas, Tex.

[21] Appl. No.: 207,456

[22] Filed: Mar. 7, 1994

[51] Int. Cl.$^6$ .............. B23K 20/04; B21D 53/04
[52] U.S. Cl. .............. 228/190; 228/199; 228/247
[58] Field of Search .............. 228/183, 190, 228/199, 231, 247, 262.31, 262.42, 235.2

[56] References Cited

U.S. PATENT DOCUMENTS

| | | | |
|---|---|---|---|
| 2,753,623 | 7/1956 | Boessenkool et al. | 228/205 |
| 3,648,353 | 3/1972 | Anderson | 228/190 |
| 4,340,650 | 7/1982 | Pattanaik et al. | 228/56.3 |
| 4,737,418 | 4/1988 | Slattery | 228/190 |
| 4,936,504 | 6/1990 | Arai et al. | 228/190 |
| 5,060,845 | 10/1991 | Suenaga et al. | 228/190 |

FOREIGN PATENT DOCUMENTS

| | | |
|---|---|---|
| A-380200 | 8/1990 | European Pat. Off. . |
| A-595254 | 5/1994 | European Pat. Off. . |
| 47708 | 8/1977 | U.S.S.R. .............. 228/190 |

OTHER PUBLICATIONS

IBM Technical Disclosure Bulletin, "Soldered Center Shields", vol. 10, No. 1, p. 99, Jun., 1967.

Patent Abstracts of Japan, vol. 13, No. 11 (C–558), 11 Jan. 1989 & JP-A-63 216939 (Kobe Steel Ltd) 9 Sep. 1988.

*Primary Examiner*—Samuel M. Heinrich
*Attorney, Agent, or Firm*—Russell E. Baumann; Richard L. Donaldson; René E. Grossman

[57] ABSTRACT

A self-brazing material 10 for use in a heat exchanger 50 using a corrosive heat exchanger fluid is manufactured by providing a first substrate layer 10 and a second layer 12 metallurgically bonding the two layers together to form a composite material 22. This second layer 12 is made of a material chosen from a group consisting of materials capable of having good high temperature and corrosive properties, and melting at a temperature well below that of the first material 10. The bonded material 22 is then reacted so as to render the second layer 12 a brazing layer for the first substitute layer 10 with excellent high temperature and corrosive properties.

11 Claims, 2 Drawing Sheets

HEAT EXCHANGER ASSEMBLIES-MATERIAL FOR USE THERIN, AND A METHOD OF MAKING THE MATERIAL

BACKGROUND OF THE INVENTION

This invention relates to a composite material having corrosion resistance in extremely corrosive environments and a method of manufacture typically for use in heat exchanger applications.

It has been known to manufacture plate-and-fin type stainless steel heat exchangers by brazing the plates of the unit with copper. The brazing prevents leakage from the channels by sealing each plate around the edge and at the ports. In such a design no gaskets or frames need be used which results in a compact, cost effective design. These brazed units further have thermal efficiency advantages over the gasketed plate heat exchangers. Such a brazed unit can be constructed from "self-brazing" composite material such as copper bonded to the stainless steel or nickel super alloy plate material. Such self-braze composite materials provide for reliable and economical manufacture of the heat exchanger units.

Deficiencies in the above described unit occur, however, in applications in which high temperatures are experienced or in which a corrosive material to copper is used as the heat exchanger fluid such as ammonia and acidic solutions. In such applications the copper braze material is unacceptable and a replacement is needed. One proposed replacement is a class of nickel base materials with alloying additions such as silicon and boron to reduce the melting point. These materials, however, are quite brittle and thereby only allow for fabrication as a preform foil in an amorphous state by rapidly quenching or as a preform of powder in a binder. These preforms cannot be readily formed or bonded to the plate material to form a self-brazing composite and therefore require extra handling and precise positioning when fabricating the heat exchanger. These extra handling steps can also effect the reliability of the braze; and ultimately, the final product.

SUMMARY OF THE INVENTION

Accordingly, it is an object of the present invention to provide an improved material and method of manufacture thereof which exhibits superior strength and corrosion characteristics for heat exchanger applications using corrosive heat exchanger fluid.

It is a further object of the present invention to provide a composite material which includes a brazing material bonded to a substrate plate material which can be easily and reliably assembled into a heat exchanger.

It is yet another object of the present invention to provide a heat exchanger which is easily and economically manufactured and highly reliable in use with corrosive fluids.

In accordance with this invention, a self-brazing material for a heat exchanger is made by providing a substrate layer of a first material chosen from the group consisting of stainless steels and nickel super alloys, providing a second layer of a material chosen from the group consisting of materials capable of having good high temperature and corrosion properties and melting at a temperature well below that of the first material, bonding metallurgically said first and second layers together, said bonded materials being readily formable and reacting said second layer of said bonded material so as to render the second layer a brazing layer for the first layer with excellent high temperature and corrosion properties.

In accordance with another aspect of the present invention, the second layer is metallurgically bonded to both the top and bottom surfaces of the first layer.

In one embodiment of the present invention, the second layer comprises a multicomponent material of a nickel or high nickel alloy and a titanium or high titanium alloy in which the reacting step is controlled heating to cause the nickel/high nickel alloy to alloy with the titanium/high titanium alloy to form a lower melting point brazing alloy layer.

In another embodiment of the present invention, the second layer comprises a nickel silicon or a family of nickel-silicon-iron-chromium alloy in which the reaction step is a controlled boronizing heating step of the second layer to yield a nickel/silicon/boron brazing alloy to form the brazing layer.

DESCRIPTION OF THE DRAWINGS

Other objects, advantages and details of the novel material and method of manufacture of this invention appear in the detailed description of the preferred embodiments of the invention, the detailed description referring to the drawings in which.

DESCRIPTION OF THE PREFERRED EMBODIMENTS

Figure 1:
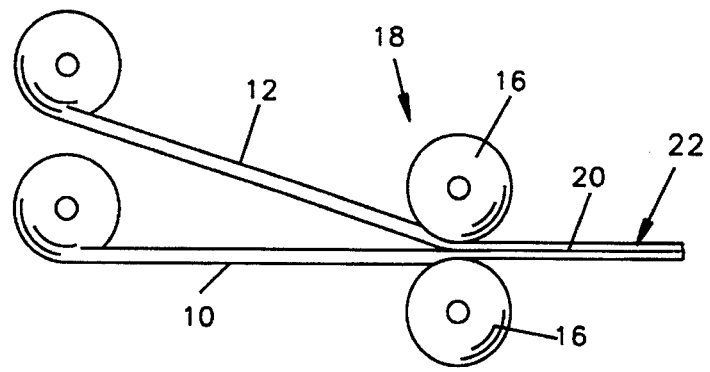
FIG. 1 shows a side elevation view diagrammatically illustrating the solid state bonding method of this invention.
Figure 2:
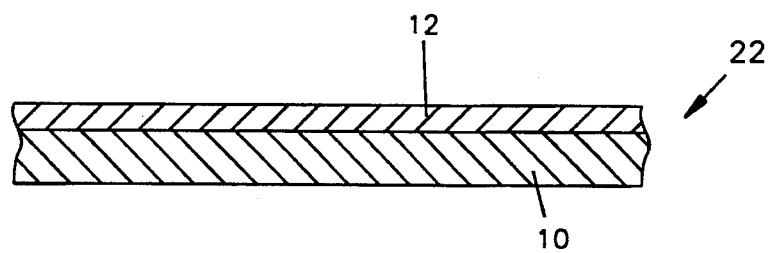
FIG. 2 shows a cross-section of a two layer composite material of this invention after bonding.

In accordance with the novel and improved method and material of this invention, a first substrate layer 10 is bonded to a second layer 12. As shown in FIG. 1, the two layers 10 and 12 are passed between a pair of pressure rolls 16 in a conventional rolling mill 18. The layers are squeezed together with sufficient force to be reduced in thickness typically over 65 percent, and bonded together along an interface 20 between the metal layers to form a composite multilayer metal material 22 as shown in FIG. 2. Typically, the material is then rolled to the finished desired thickness and then annealed in an inert or reducing atmosphere ready for forming into the desirable shape to be used in a heat exchanger. It is important that the composite material can be fully annealed to allow for the forming needed to be able to manufacture a heat exchanger in addition to being readily formable (i.e., not brittle).

Typically, the first layer 10 comprises a stainless steel, preferably a 300 series austenitic stainless steel, with good high temperature and corrosion properties such as 316L Stainless Steel, 347 Stainless Steel, etc., or a 400 series ferritic stainless steel, or a nickel base super alloy such as the Inconel family of metals with nickel and chromium and iron alloying additions. The second layer 12 comprises a material capable of having good high temperature and corrosion properties and melting at a temperature well below that of the first layer. This second layer, when reacted as explained in detail below, will be the brazing material for the composite when used in a heat exchanger unit.

Figure 3:
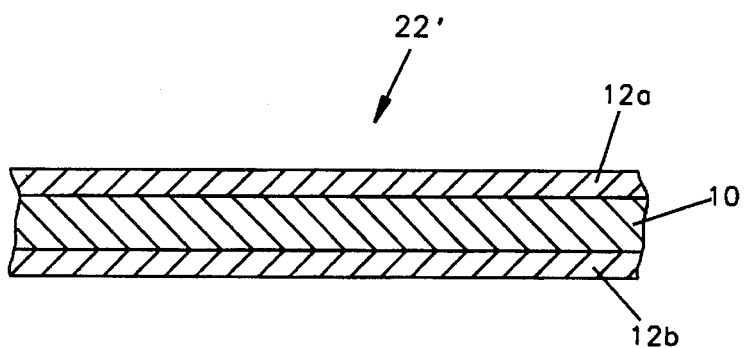
FIG. 3 shows a cross section of a three layer composite material of this invention after bonding.

It is to be understood that the invention could equally well be practiced with a first substrate layer 10 being bonded on both top and bottom with second layers 12a and 12b forming a composite multilayer material 22' as shown in FIG. 3. The layers 12a and 12b would typically be of equal thickness. It is to be understood, however, that the thickness of layers 12a and 12b may be different if different amounts of braze is required on the two sides of base metal 10.

Figure 4:
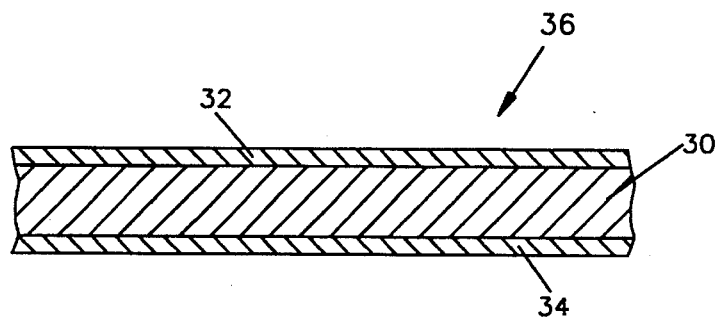
FIG. 4 shows a cross section of a multicomponent bonded material as the braze layer of this invention.

In a preferred embodiment of a composite material for heat exchangers having excellent high temperature and corrosion properties, the first layer 10 is stainless steel and the second braze layer 12 comprises a multilayer material with a layer or 10 layers of nickel or high content nickel alloys and titanium or high content titanium alloys. These layers of material are preferably metallurgically bonded by pressure roll bonding as known in the art. A preferred second layer has a center core 30 of titanium sandwiched between two outer layers 32 and 34 of nickel (to generally shield the highly reactive titanium) and bonded into a multilayer material 36 as is shown in FIG. 4. A typical multilayer material 36 has the titanium core equal to 50 percent of the total thickness with the outer nickel portions each equaling 25% of the total thickness. This multilayer material 36 comprising the second braze layer 12 is in turn bonded to the first layer 10 as described above yielding the composite metal material 22 which is then sintered (thermally treated to improve bond strength) at between 1000° to 1900° F. and then rolled to the desired finished thickness. The typical composite has the braze layer 12 ranging from 5 to 20 percent of the total composite thickness. This material can then be heat treated at between 1200° to 2000° F. to allow the material to be easily formed while still remaining well below the brazing temperature of second layer 12. The annealed composite material is then formed in the desired shape for assembly into the finished heat exchanger. This formed composite material is then heated to react the nickel and titanium materials in the braze layer in situ to form the lower melting point braze alloy. This braze material is melted and upon solidification forms the required component as part of a heat exchanger. The typical brazing temperature for this braze layer 12 is 2100° F. for sufficient time for complete melting of the braze layer to take place.

Figure 5:
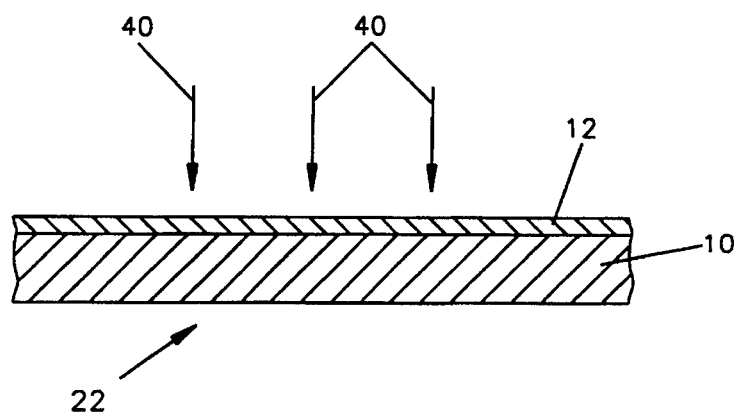
FIG. 5 shows a cross section of a bonded two layer composite material of this invention with the addition of a chemical element.
Figure 6:
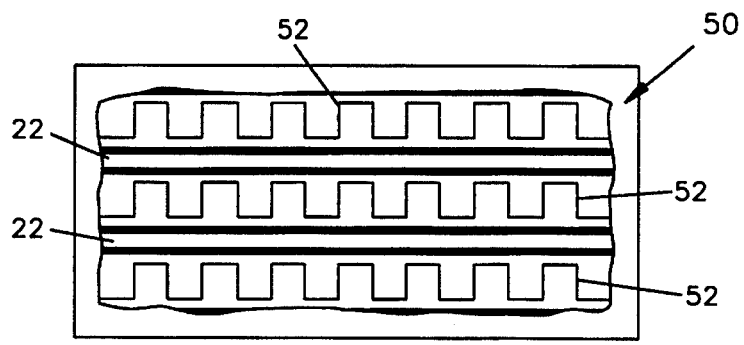
FIG. 6 shows the composite material of this invention used in a heat exchanger.

In accordance with another preferred embodiment of the present invention, the second layer 12 was made from a readily formable nickel silicon alloy with approximately 4 wt. percent silicon and the balance nickel. This readily formable alloy is metallurgically roll bonded as described above to a stainless steel or nickel super alloy plate substrate 10 to form the composite multilayer metal material 22. As in the first described preferred embodiment, second layer 12 is typically between 5 and 20 percent of the total thickness of the composite material. Composite material 22 is sintered at approximately 1200° to 1900° F. and rolled to the described finish thickness. The material is then annealed and the annealed composite material is then formed in the described shape for use in the finished heat exchanger assembly. The formed material is then reacted by boronizing by a conventional process at 1200° to 1400° F. as is known in the art and diagrammatically shown by arrows 40 in FIG. 5. The boron is added to a level to yield the composition of the second layer of 4 wt. percent silicon, 3 wt. percent boron and the balance nickel. Such an alloy is a good brazing alloy with stainless steel or nickel super alloy; and even though brittle with the addition of the boron, it is acceptable for use in heat exchanger applications because the forming was performed prior to the reacting boronizing step. It is to be understood the depth of the boronizing is typically equal to the thickness of the second layer although it could be done to a lesser depth. The composite is then assembled into the heat exchanger unit 50, as shown in part in FIG. 6, and heated to melt the braze and finish the heat exchanger unit.

It is to be understood that other elements can be added to the nickel provided such alloying additions still provide a material that is easily formable and when boronized will melt at an acceptable brazing temperature, typically under 2200° F., which is significantly under the melting temperatures of the material used for first substrate plate layer 10. Such elements principally include chromium and iron typically in the amounts of 7–20 wt. percent and 3–5 wt. percent respectively.

In accordance with the invention, the step of reacting the bonded composite material refers to altering the second layer to be a low melting point brazing layer for the first substrate layer. This reacting can be thermal or thermal with the addition of chemical substances such as the boron.

In order to give greater appreciation of the advantages of the invention, the following examples are given:

EXAMPLE I

A continuous strip of completely annealed commercially pure titanium having a thickness of 0.040 of an inch is cleaned by chemical agents. This strip is then sandwiched between two continuous strips of annealed and cleaned 201 nickel (pure) strip of 0.020 of an inch each and roll bonded in a single operation to yield a solid state metallurgically bonded composite of 0.030 of an inch as described in U.S. Pat. No. 2,753,623 which is incorporated herein by reference. This composite strip is sintered at 1300° F. and rolled to 0.010 of an inch and annealed at 1300° F. The annealed strip is then prepared for bonding by conventional cleaning to 316L Stainless Steel. A 0.010 of an inch strip of nickel/titanium/nickel is bonded on both sides of a 0.060 of an inch strip of 316L Stainless Steel. Additionally, the roll bonded composite strip of 0.025 of an inch is sintered at 1900° F. and then rolled to a finish thickness of 0.020 of an inch and annealed at 1900° F. to a fully annealed condition. This material is easily formable and ready for fabrication as a component of a heat exchanger.

EXAMPLE II

A continuous strip of completely annealed nickel 4% by wt. silicon alloy of 0.010 of an inch thick is prepared for bonding. The strip is then roll bonded to both sides of a 0.040 of an inch thick strip of 316L Stainless Steel to produce a composite having a thickness of 0.020 of an inch. This composite is sintered at 1900° F. yielding a completely soft composite material ready for forming. The strip is blanked and formed into a component part for a heat exchanger unit. This formed part of the composite is then reacted by boronizing using a standard commercial process. The depth of the boronizing is equal to the thickness of the nickel/silicon alloy layer in the composite. The amount of boron introduced in the nickel/silicon alloy layers changes the chemistry of them to 4% wt. silicon, 3% wt. boron and the balance nickel. The formed composite is now ready for assembly into heat exchanger units and brazing.

EXAMPLE III

This example was carried out identical to Example I above except the 316L Stainless Steel was replaced with Inconel 625 material (58% wt. nickel, 20 to 23% wt. chromium, 5% wt. iron, 8 to 10% wt. molybdenum, 3.15 to 4.15% wt. niobium and tantalum and 0.10% wt. carbon maximum ).

EXAMPLE IV

This example was carried out identical to Example I above except the finish composite material is further blanked and formed into the shape for use in a heat exchanger unit. A stack-up of corrugated 316L Stainless Steel foil 52 and the sheets 22 of nickel/titanium/nickel clad 316L Stainless Steel is made (see FIG. 6) and brazed in a vacuum at 2100° F. Strong braze joints were obtained with uniform flow of the braze material (nickel/titanium/nickel) and fillet formation at the joint area.

EXAMPLE V

This example was carried out identical to Example II above except the formed boronized finished composite 22 for a heat exchanger is further assembled in a stack-up with corrugated 0.010 of an inch 316L Stainless Steel foil 52. This assembled structure is brazed in a vacuum at a temperature of 1975° F. yielding a uniform strong brazed joint with good bonded braze layer.

The novel process and article produced by the method of the present invention provides for a self-braze composite material for use in heat exchangers with superior corrosion resistance and good high temperature properties. The material is easily and economically produced for manufacturing highly reliable and durable heat exchangers. While the invention has been described in combination with the specific embodiments thereof, it is evident that many alternatives, modifications and variations will be apparent to those skilled in the art in light of the foregoing description.

We claim:

1. A method for making a self-brazing composite material for use in a heat exchanger using a corrosive heat exchanger fluid comprising:

providing a first substrate layer of a first material chosen from the group consisting of stainless steels and nickel super alloys;

providing a second layer of a second material comprising a multicomponent material chosen from the group consisting of a nickel or nickel alloy and a titanium or titanium alloy materials capable of having good high temperature and corrosion properties and melting at a temperature well below that of the first material;

metallurgically bonding said first and second layers together to form a bonded composite material being readily formable; and reacting said bonded composite material by controlled heating so as to render the second layer of the nickel or nickel alloy to alloy with the titanium or high titanium alloy to form a lower melting point brazing alloy layer for the first layer with excellent high temperature and corrosion properties.

2. The method of claim 1 wherein said second layer is metallurgically bonded to both the top and bottom surfaces of the first layer.

3. The method of claim 1 wherein said multicomponent material is a three layer material with nickel on the top and bottom and titanium sandwiched therebetween.

4. The method of claim 3 wherein the nickel top and bottom layers are essentially one half the thickness of the center titanium layer.

5. The method of claim 3 wherein the first material is a stainless steel.

6. The method of claim 3 wherein the first material is a nickel base super alloy.

7. A method for making a self-brazing composite material for use in a heat exchanger using a corrosive heat exchanger fluid comprising:

providing a first substrate layer of a first material chosen from the group consisting of stainless steels and nickel super alloys;

providing a second layer of a second material of a nickel silicon alloy having good high temperature and corrosion properties and melting at a temperature well below that of the first materials;

metallurgically bonding said first and second layers together to form a bonded composite material being readily formable; and reacting said bonded composite material by a controlled boronizing heating step of the second layer to yield a nickel, silicon and boron brazing alloy to form a braze layer for the first layer with excellent high temperature and corrosion properties.

8. The method of claim 7 wherein said braze layer has a final composition of 3–4 wt. percent silicon, 2–4 wt. percent boron and the balance nickel.

9. The method of claim 8 wherein said braze layer also includes 3–5 wt. percent iron and 7–20 wt. percent chromium.

10. The method of claim 7 wherein said second layer is bonded to both the top and bottom surfaces of the first layer.

11. The method of claim 10 wherein said controlled boronizing heating step in administered to a depth of the composite material equal to thickness of the second layer.

* * * * *